United States Patent
Gimmler et al.

(10) Patent No.: US 6,216,068 B1
(45) Date of Patent: Apr. 10, 2001

(54) METHOD FOR DRIVER-BEHAVIOR-ADAPTIVE CONTROL OF A VARIABLY ADJUSTABLE MOTOR VEHICLE ACCESSORY

(75) Inventors: Helmut Gimmler, Schwaikheim; Andreas Heidinger, Winterbach; Klaus-Peter Kuhn, Plüderhausen; Jochen Strenkert, Stuttgart, all of (DE)

(73) Assignee: Daimler-Benz Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/185,482

(22) Filed: Nov. 3, 1998

(30) Foreign Application Priority Data

Nov. 3, 1997 (DE) .............................................. 197 48 424

(51) Int. Cl.[7] .................................................. G06F 7/00
(52) U.S. Cl. ................................................. 701/36; 701/51
(58) Field of Search .................................. 701/36, 37, 41, 701/44, 51, 55, 56, 57, 58, 59, 77, 98; 706/905

(56) References Cited

U.S. PATENT DOCUMENTS

| | | | |
|---|---|---|---|
| 4,679,145 | * 7/1987 | Beeck et al. | 701/51 |
| 5,182,710 | * 1/1993 | Tomisawa | 701/56 |
| 5,189,621 | * 2/1993 | Onari et al. | 701/102 |
| 5,475,591 | * 12/1995 | Suzuki et al. | 701/98 |
| 5,540,632 | * 7/1996 | Lardy et al. | 477/43 |
| 5,557,521 | * 9/1996 | Danz et al. | 701/57 |
| 5,576,961 | * 11/1996 | Genzel et al. | 701/101 |
| 5,684,699 | * 11/1997 | Sugiyama | 701/41 |
| 5,857,161 | * 1/1999 | Zeilinger et al. | 701/51 |

FOREIGN PATENT DOCUMENTS

| | | |
|---|---|---|
| 33 41 652 | 12/1987 | (DE) . |
| 42 15 406 | 11/1993 | (DE) . |
| 44 01 416 | 7/1995 | (DE) . |
| 44 11 940 | 10/1995 | (DE) . |
| 43 42 204 | 9/1996 | (DE) . |
| 197 29 251 | 4/1997 | (DE) . |
| 433 603 | 6/1991 | (EP) . |
| 2285876 | * 7/1995 | (GB) . |
| 6-502702 | 3/1994 | (JP) . |
| 92/09448 | 6/1992 | (WO) . |

OTHER PUBLICATIONS

Welter et al., "Die Adaptive Getriebesteuerung für BMW–Automobile," ATZ Automobiltechnische Zeitschrift 95 (1993), pp. 420–434, Described in Specification.

* cited by examiner

Primary Examiner—Michael J. Zanelli
Assistant Examiner—Eric M Gibson
(74) Attorney, Agent, or Firm—Kenyon & Kenyon

(57) ABSTRACT

A method for driver-behavior-adaptive control of a variably adjustable motor vehicle accessory. One or more parameters indicative of driver behavior are sensed and a pertinent driver behavior is ascertained therefrom. Accessory adjustment is performed variably as a function of the driver behavior that was ascertained. The driver behavior is ascertained in terms of a long-term driving manner component, and a short-term dynamic demand component and/or a steady-speed request component. Accessory adjustment is performed, if a short-term dynamic demand exists, in accordance with an adjustment characteristic having a dynamic level corresponding at least to that dynamic demand. When a constant-speed request exists, accessory adjustment is performed in accordance with a relevant low-dynamic adjustment characteristic. Otherwise, accessory adjustment is performed in accordance with an adjustment characteristic determined by the long-term driving manner component.

4 Claims, 2 Drawing Sheets

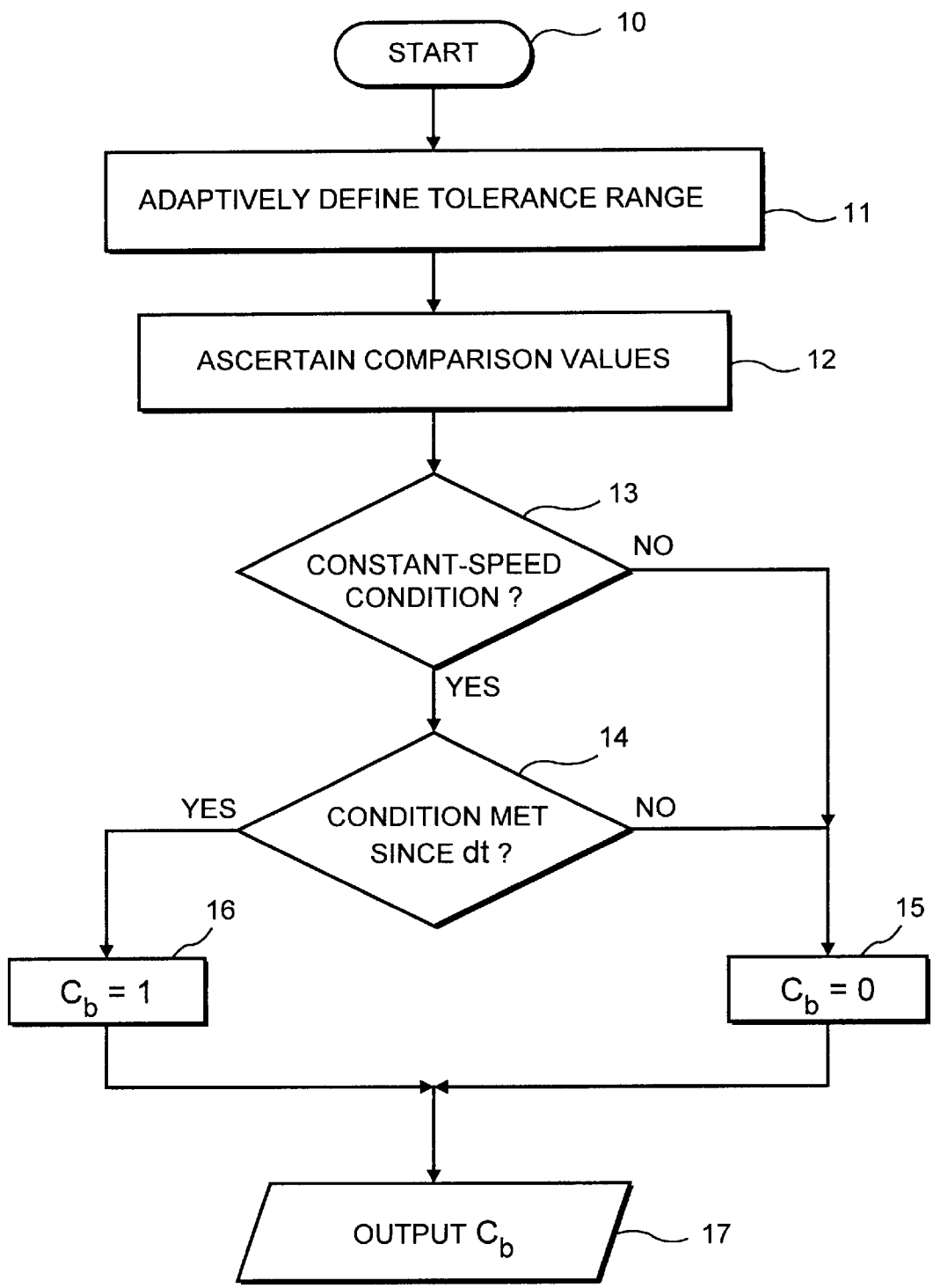
F I G. 2

METHOD FOR DRIVER-BEHAVIOR-ADAPTIVE CONTROL OF A VARIABLY ADJUSTABLE MOTOR VEHICLE ACCESSORY

FIELD OF THE INVENTION

The present invention refers to a method for driver-behavior-adaptive control of a variably adjustable motor vehicle accessory. Adjustment of the accessory, which for example can be a multiple-ratio automatic transmission or a continuously variable transmission of a drive system of a passenger car, is performed variably as a function of ascertained driver behavior.

RELATED TECHNOLOGY

A method for driver-behavior-adaptive control of a variably adjustable motor vehicle accessory is described in German Patent Application No. 44 01 416 A1. The driver behavior is determined as a longer-term variable via a driving manner determination which comprises a separate determination of an acceleration index for the acceleration behavior, a braking index for the braking behavior, and a steering index for the steering behavior. With these indices, the driving manner of a particular vehicle driver, i.e., the driver behavior, can be characterized over a comparatively long time period on the order of at least minutes. This characterization can then be used to variably adjust a variably adjustable motor vehicle accessory—for example a drive motor, a transmission coupled thereto, a braking system, and/or a level control system—in accordance with the particular driving manner.

A driving manner classification of this kind which describes a longer-term driver behavior does not allow automatic, short-term changes in the adjustment of the relevant motor vehicle accessory. Short-term changes of this kind are, however, desirable in many situations, both in the direction of greater dynamics, for example in an emergency situation, and in the direction of gentle driving, for example when encountering a traffic jam and then driving in slow traffic.

German Patent Application No. 44 11 940 A1 discloses a method and a device for controlling a continuously variable transmission connected to an internal combustion engine. The method includes detection of a steady-speed driver behavior that is assumed to exist if, in a normal driving mode, no appreciable excess of tractive force exists, an output control member of the internal combustion engine (e.g., a throttle valve) is being actuated, and the rate of change in the adjustment of that output control member and the rate of change in the vehicle speed are below a particular limit value. The transmission is adjusted differently when a steady speed is detected than in other driving modes. Because of the manner in which the steady speed is detected, the existence of a steady-speed request is detected on a relatively short-term basis, i.e., more quickly than is achieved with a driving manner evaluation applied to a description of longer-term driver behavior.

German Patent Application No. 197 29 251 describes a method for detecting a spontaneous dynamic demand of a motor vehicle driver. With this method, a sudden demand for higher driving dynamics can be detected comparatively quickly, i.e., faster than with a longer-term driving manner evaluation. In contrast to the usual "kick-down switch" for detecting a spontaneous dynamic demand, this method detects the spontaneous dynamic demand on the basis of the magnitude of the actuation of an actuation device, taking into account the average actuation behavior exerted by the relevant vehicle driver on that actuation device. As a result, in the case of a vehicle driver with a fairly dynamic driving style, the demand for spontaneously higher dynamics is recognized only with a relatively vigorous actuation.

German Patent No. 43 42 204 C2 describes a method for controlling a motor vehicle drive unit, consisting of an engine and a transmission, in which this control is implemented as a function of an evaluation number, indicative of driver behavior, which is obtained by temporal filtration of continuously determined current evaluation numbers. The current evaluation numbers are determined by comparing the current engine output with two vehicle-speed-dependent output characteristic curves, one of which corresponds to an economical and the other to a sporty driving manner. Depending on the filter characteristic selected, a desired time dependence of the filtered evaluation number can be set.

German Patent No. 33 41 652 C2 discloses a driver-behavior-adaptive control system for a clutch/transmission unit in which an accelerator pedal activity parameter is ascertained in each case from a definable number of previously sensed accelerator pedal position values, for example as the weighted sum of the accelerator pedal position values. This parameter is interpreted as a variable evaluating a driving situation and/or the driving style of a driver, and is utilized to influence limit values for transmission shifting decisions in such a way that a continuous transition from a consumption-optimized shifting program to a performance-optimized one is achieved.

European Patent Application No. 0 433 603 A2 discloses a specific method for ascertaining the driving manner of a motor vehicle driver on the basis of a continuous monitoring of the position of an engine output control member that can be activated by the vehicle driver, such as an accelerator pedal. In this context, provision can be made for ascertaining a longer-term and a shorter-term driver factor, the longer-term driver factor serving fundamentally as the ultimate control signal for a vehicle accessory that is to be influenced. If the two factors differ by more than a definable quantity, a new driver factor serving as the control signal is generated from a weighted average of the two factors.

The journal article A. Welter et al., "Die Adaptive Getriebesteuerung für BMW-Automobile (Adaptive transmission control system for BMW automobiles)", ATZ Automobiltechnische Zeitschrift 95 (1993), page 420, describes a transmission control system which adaptively uses different transmission shifting programs in different driving situations. The driving situations include steady-speed driving, acceleration, deceleration, curves, uphill, downhill, winter driving, and stop-and-go driving.

German Patent Application No. 42 15 406 A1 discloses an automatic transmission control system in which shifting of the transmission gear ratios occurs on the basis of a fuzzy logic method, with which criteria such as vehicle performance, fuel consumption, and complexity of design of the shifting strategy are taken into account. According to specific fuzzy logic rules, the driving manner of the particular driver is classified between an economy-oriented and a performance-oriented driving manner. In addition, the current vehicle status is taken into account in the fuzzy logic evaluation.

SUMMARY OF THE INVENTION

An object of the present invention is to provide a method with which a variably adjustable motor vehicle accessory can be controlled in driver-behavior-adaptive fashion taking into account the longer-term driver behavior, in particular the driving manner of a particular vehicle driver, and which moreover makes possible short-term, automatic control reactions to a spontaneous dynamic demand and/or the initiation of a request for a steady speed.

The present invention provides a method for driver-behavior-adaptive control of a variably adjustable motor vehicle accessory, in which one or more parameters indicative of driver behavior are sensed, and a pertinent driver behavior is ascertained therefrom. Accessory adjustment is performed variably as a function of the driver behavior that was ascertained. The driver behavior is ascertained in terms of a long-term driving manner component which represents a long-term driving-manner-related driving behavior, and a short-term dynamic demand component which represents short-term driving dynamics change demands. Accessory adjustment is performed, if a short-term dynamic demand exists, in accordance with an adjustment characteristic having a driving dynamics change level corresponding at least to that short-term dynamic demand; and otherwise in accordance with an adjustment characteristic determined by the long-term driving manner component.

The present invention also provides a method for driver-behavior-adaptive control of a variably adjustable motor vehicle accessory, in which one or more parameters indicative of driver behavior are sensed, and a pertinent driver behavior is ascertained therefrom. Accessory adjustment is performed variably as a function of the driver behavior that was ascertained. The driver behavior is ascertained in terms of a long-term driving manner component which represents a long-term driving-manner-related driving behavior, and a constant-speed request component. Accessory adjustment is performed, if a constant-speed request exists, in accordance with a relevant low-dynamic adjustment characteristic having a lower driving dynamics change level as compared with that of short-term driving dynamics change demands; and otherwise in accordance with an adjustment characteristic determined by the long-term driving manner component. When a steady-speed request exists, accessory adjustment is performed according to a lower-dynamic adjustment characteristic corresponding to gentle driver behavior.

The present invention also provides a method for driver-behavior-adaptive control of a variably adjustable motor vehicle accessory, in which one or more parameters indicative of driver behavior are sensed, and a pertinent driver behavior is ascertained therefrom. Accessory adjustment is performed variably as a function of the driver behavior that was ascertained. The driver behavior is ascertained in terms of a long-term driving manner component which represents a long-term driving-manner-related driving behavior, a short-term dynamic demand component which represents short-term driving dynamics change demands, and a constant-speed request component. Accessory adjustment is performed, if a short-term dynamic demand exists, in accordance with an adjustment characteristic having a driving dynamics change level corresponding at least to that short-term dynamic demand; if a constant-speed request exists, in accordance with a relevant low-dynamic adjustment characteristic having a lower driving dynamics change level as compared with that of short-term driving dynamics change demands; and otherwise in accordance with an adjustment characteristic determined by the long-term driving manner component.

According to the present invention, driver behavior is determined on the one hand with respect to a long-term driving manner component, and on the other hand with respect to a short-term dynamic-demand component and/or a steady-speed request component. In the absence of a short-term dynamic demand and a steady-speed request, adjustment of the controlled motor vehicle accessory, such as a transmission, is accomplished in accordance with an adjustment characteristic defined by the long-term driving style component.

In a further development of the present invention, driver behavior is determined in the form of a continuously updated driver behavior index whose value range extends between a gentle driver behavior and a highly dynamic driver behavior, and as a function of which the current adjustment characteristic is selected. In this context, consideration is given not only to the long-term driving manner component but also to the short-term dynamic demand component and the steady-speed request component. When a short-term dynamic demand exists, the index is set to a value whose associated driver behavior dynamic level is at least as great as the dynamic level being demanded in the short term. When a steady-speed request exists the index is set to an appropriate value representing a gentle driver behavior. Otherwise the index is set to the value which represents the long-term driving manner component.

BRIEF DESCRIPTION OF THE DRAWINGS

The present invention is described below with reference to the drawings, in which:

FIG. 2 shows a flow chart of a method constituting a portion of the method of FIG. 1, for detecting a steady-speed request.

DETAILED DESCRIPTION

Figure 1:
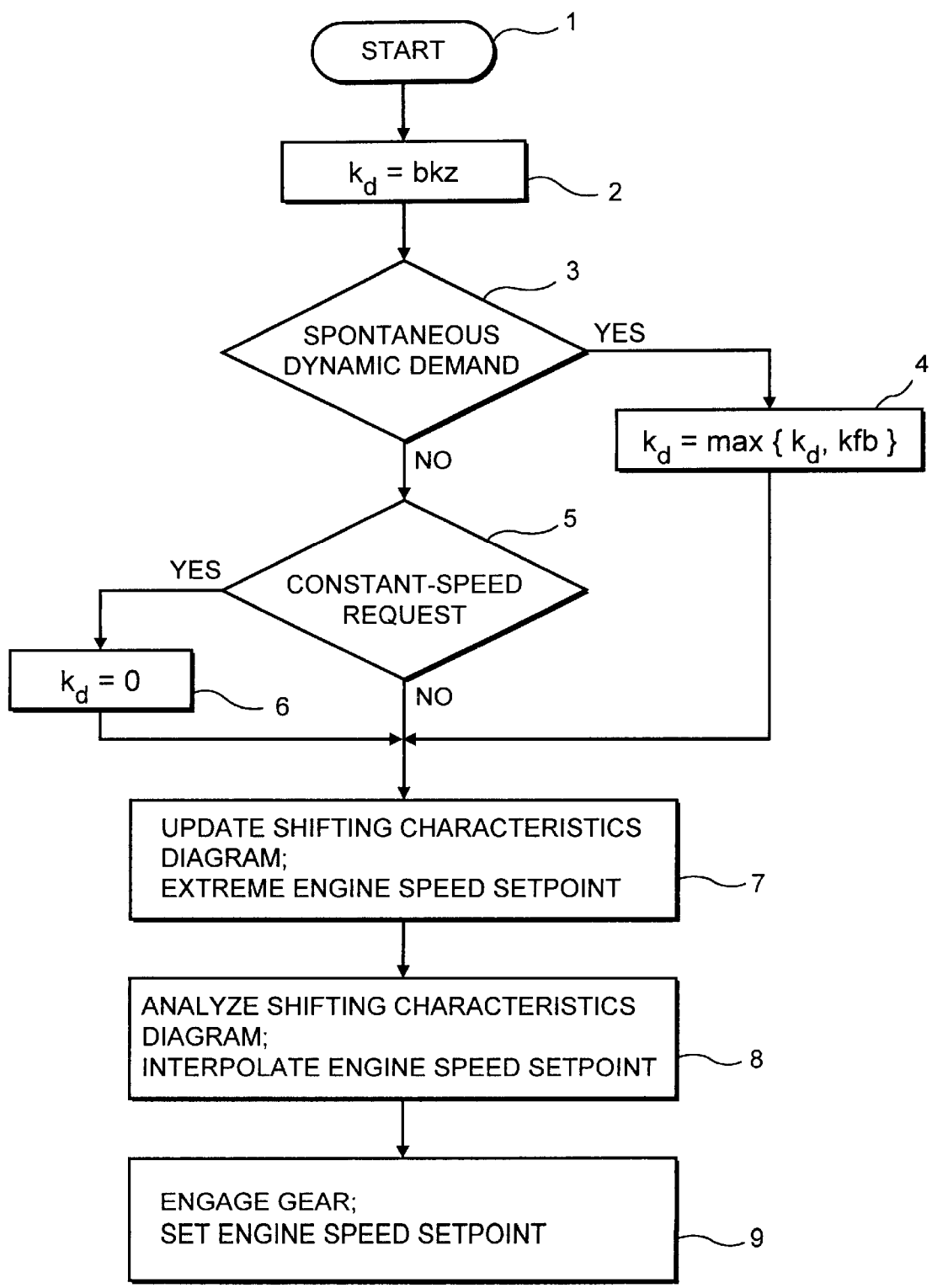
FIG. 1 shows a flow chart of a method for driver-behavior-adaptive control of a motor vehicle transmission.

The method illustrated in FIG. 1 provides driver-behavior-adaptive control of a variably adjustable motor vehicle transmission in the form of a multiple-ratio automatic transmission or a continuously variable transmission. Both the longer-term driver behavior, i.e., the driving manner of the particular vehicle driver, and short-term dynamic change requests both in the direction of a spontaneous dynamic demand (for example in an emergency situation) and in the direction of a steady-speed request (for example when beginning to drive in slow traffic) are taken into account. Thus shifting behavior in the case of a multiple-ratio automatic transmission, or the engine speed setpoint definition in the case of a continuously variable transmission, is adapted to the longer-term driving style. Special situations with short-term changes in dynamics are also considered. These attributes allow the gear ratio to be adjusted optimally, in practically all driving situations, in accordance with the expectations of the vehicle driver.

Leaving aside special functions, the shifting behavior of the multiple-ratio automatic transmission, or, in the case of the continuously variable transmission, the engine speed setpoint definition, depends primarily on the accelerator pedal or throttle valve position and the vehicle speed. Therefore, the method as embodied herein in exemplary fashion, for variable transmission adjustment of a multiple-ratio automatic transmission, is based on shifting curves for the possible gear change between adjacent gear ratios. The respective gear change is triggered when a value drops below or rises above these curves, which together constitute the so-called shifting characteristics diagram. For the present method, two extreme shifting curves are predefined for each possible gear change, one of which is associated with an extremely gentle and the other with an extremely sporty driving style. Between the two curves the respective currently selected shifting curve is determined by continuous interpolation as a function of a continuously currently ascertained driver behavior index. In the case where a continuously variable transmission is used, the engine speed setpoint definition is stored in a three-dimensional characteristics diagram as a function of accelerator pedal position and vehicle speed. To implement driver-behavior-adaptive control of the transmission in this case, instead of the conventional permanently predefined characteristics diagram two extreme characteristics diagrams are predefined. One of the extreme characteristics diagrams again corresponds to an extremely gentle and the other to an extremely dynamic driving style. Between the two diagrams the respective currently selected characteristics field is determined by continuous—and, optionally, nonlinear—interpolation as a function of the ascertained driver behavior index. The driver behavior index is in each case ascertained currently in such a way that short-term dynamic changes in terms of a rapid dynamic demand or a steady-speed request are taken into account in controlling the transmission. Also, the control is accomplished taking into account an ascertained longer-tern driving manner for purpose of adaptation to the particular driving style of the vehicle driver.

FIG. 1 depicts an example of this method for driver-behavior-adaptive transmission control, in the form of a process cycle that is executed cyclically at predefined time intervals. After a starting step 1, an identifier bkz is selected as a starting value for the driver behavior index $k_d$, as shown in step 2. Identifier bkz is representative of the driver's driving style, and is obtained from a conventional driving manner evaluation system, thus representing the driver's longer-term behavior, i.e., the driving style of the vehicle driver. A suitable variable for this driving style identifier bkz is, for example, the acceleration identifier, as used in the method for gradual driving manner classification known from German Patent Application No. 44 01 416 A1, discussed above, and which is herewith incorporated by reference herein. The acceleration identifier is indicative of driving manner and is obtained using the acceleration behavior of the vehicle.

Advantageously, the acceleration identifier is used in the present method in a scaled form, such that the starting value for the driver behavior index $k_d$ lies in the range between zero and one, zero corresponding to an extremely gentle driving manner and one to an extremely dynamic one.

In step 3, a query is made as to whether a spontaneous dynamic demand from the vehicle driver exists. Detection of whether such a spontaneous dynamic demand exists may be accomplished, for example, in accordance with the method described in German Patent Application No. 197 29 251, which is herewith incorporated by reference herein, as is corresponding U.S. patent application Ser. No. 08/112,895. In this way the dynamic level demanded on a short-term basis can simultaneously be determined. This dynamic level may be defined, for example, in proportion to the actuation speed of an existing accelerator pedal, the proportionality constant comprising a driver-specific sensitivity which takes into account how quickly, on average, the vehicle driver actuates the accelerator pedal in normal driving without a spontaneous dynamic demand.

If the existence of a spontaneous dynamic demand is identified, then in step 4 a redefinition of the driver behavior index $k_d$ takes place in such a way that the new value for index $k_d$ is defined as the greater of the previous value of index $k_d$ on the one hand, and the dynamic level kfb identified for the spontaneous dynamic demand on the other hand. This ensures that the driver behavior dynamic taken as the basis for the subsequent transmission control actions is one which corresponds at least to the dynamic level of the spontaneous dynamic demand, and is even higher when indicated on the basis of the ascertained driving style.

If it is determined in query step 3 that a spontaneous dynamic demand does not exist, execution passes to query step 5 in which a determination is made as to whether a steady-speed request from the vehicle driver exists. Detection of a steady-speed request may be accomplished with the method illustrated in FIG. 2. Referring to FIG. 2, after start 10 of this detection method, tolerance ranges are predefined for the instantaneous values of the position of an accelerator pedal and for the vehicle speed, as shown in step 11. The breadth of the tolerance range for the accelerator pedal position is defined variably as a function of the minimum and maximum accelerator pedal positions of a predefinable number of previous acceleration maneuvers, optionally with suitable lower and upper boundaries. The breadth of the tolerance range for the vehicle speed is adaptively defined in similar fashion as a function of the instantaneous vehicle speed.

In step 12, comparison values, i.e., reference values, for the accelerator pedal position and vehicle speed are ascertained via sliding averaging of the respective pertinent instantaneous values over a predefinable previous driving period, typically on the order of a few seconds. Then, in step 13, a check is made as to whether predefined steady-speed conditions are being met. Toward this end, a check is made as to whether the current accelerator pedal position and current vehicle speed lie within their pertinent tolerance ranges in terms of the pertinent comparison values, whether the current vehicle speed is greater than a permanently predefined minimum value, and whether a road slope represented by a corresponding signal datum is less than the maximum manageable slope, or, alternatively, whether the current accelerator pedal position is below a maximum value that is predefined as a function of speed. Conformity with all these conditions is a necessary but not yet sufficient condition for detecting the existence of a steady-speed request. This involves, instead, a query in step 14 as to whether the steady-speed conditions have existed uninterrupted for a definable time period dt. If this is not the case, a steady-speed detection bit $c_b$ is then set to zero, as shown in step 15. Otherwise, $c_b$ is set to one, as shown in step 16. The value of steady-speed bit $c_b$ is then output, as shown in step 17, a value of one being interpreted as the existence of a steady-speed request.

As an alternative to the procedure illustrated in FIG. 2, the existence of a steady-speed request can also be determined in accordance with the method described in German Patent Application No. 44 11 940 A1, discussed above.

Referring again to FIG. 1, if it is determined, in one manner or another, in query step 5 that a steady-speed request exists, the driver behavior index $k_d$ is set to a value of zero in step 6. A value of zero represents an extremely gentle driver behavior that corresponds to the existing steady-speed request. If a steady-speed request does not exist, the driver behavior index $k_d$ remains at its starting value.

After the definition, described above, of the driver behavior index $k_d$, the corresponding driver-behavior-adaptive control of the transmission is then performed by selecting an appropriate transmission setting. Toward this end, for a multiple-ratio automatic transmission, the current shifting characteristics diagram, i.e., the totality of all current shifting curves, is first determined as a function of the currently ascertained driver behavior index $k_d$. This determination is accomplished by calculating each current shifting curve, for example by linear interpolation between the two relevantly stored extreme shifting curves using the currently ascertained driver behavior identifier as the interpolation parameter, as shown in step 7. For a continuously variable transmission, in step 7, the two extreme engine speed setpoint characteristic diagrams are determined on the basis of data pertaining to the instantaneous values for the accelerator pedal setting (or throttle valve setting) and vehicle speed.

In step 8, for the continuously variable transmission case, the currently valid engine speed setpoint is then determined by interpolation between the two current extreme engine speed setpoint characteristics diagrams, using the driver behavior index $k_d$ as the interpolation parameter. For the multiple-ratio automatic transmission case, in step 8 the previously determined actual shifting characteristics diagram is evaluated, i.e., the gear ratio to be selected is determined using data regarding the instantaneous values for accelerator pedal or throttle valve position and vehicle speed, based on the current shifting characteristics diagram.

The process cycle then ends with step 9, in which, for the multiple-ratio automatic transmission case, the transmission is shifted into the gear ratio that was determined, or in the continuously variable transmission case, the transmission is controlled in accordance with the engine speed setpoint that was determined. Continuous repetition of the process cycle just described thus results in transmission control which is consistently and optimally adapted to both longer-term and short-term driver behavior.

It should be understood that using the method according to the present invention, described above with reference to transmission control, it is also possible to achieve driver-behavior-adaptive control of other variably adjustable motor vehicle accessories. Other embodiments of the method according to the present invention include simplified methods in which, besides the longer-term driver behavior, only short-term dynamic demands or only a respective steady-speed request is taken into account for driver-behavior-adaptive control of a given motor vehicle accessory.

What is claimed is:

1. A method for driver-behavior-adaptive control of a variably adjustable motor vehicle accessory, the method comprising:

sensing at least one parameter indicative of a driver behavior so as to ascertain a driver behavior index in terms of a long-term driving manner behavior component and in terms of a short-term dynamic demand component; and adjusting the vehicle accessory variably as a function of the ascertained driver behavior index so that when a short-term dynamic demand exists the adjusting is performed in accordance with a short-term dynamic demand adjustment characteristic having a dynamic change level, the dynamic change level being a function of the short-term dynamic demand, and when the short-term dynamic demand does not exist the adjusting is performed in accordance with a long-term driving manner adjustment characteristic determined as a function of the long-term driving manner behavior component, wherein when a short-term dynamic demand exists the driver behavior index is set to a short-term dynamic value, the short-term dynamic value being the greater of a first value corresponding to the short-term dynamic demand and a second value representing the long-term driving manner behavior component.

2. A method for driver-behavior-adaptive control of a variably adjustable motor vehicle accessory, the method comprising:

sensing at least one parameter indicative of a driver behavior so as to ascertain the driver behavior in terms of a long-term driving manner behavior component and in terms of a constant-speed request component;

adjusting the vehicle accessory variably as a function of the ascertained driver behavior so that when a constant-speed request exists the adjusting is performed in accordance with a low-dynamic adjustment characteristic having a lower dynamic change level than a dynamic change level of short-term dynamic change demands, and when the constant-speed request does not exist the adjusting is performed in accordance with a long-term driving manner adjustment characteristic determined as a function of the long-term driving manner behavior component.

3. A method for driver-behavior-adaptive control of a variably adjustable motor vehicle accessory, the method comprising:

sensing at least one parameter indicative of a driver behavior so as to ascertain the driver behavior in terms of a long-term driving manner behavior component, in terms of a short-term dynamic change demand component and in terms of a constant-speed request component; and adjusting the vehicle accessory variably as a function of the ascertained driver behavior;

when a short-term dynamic demand exists the adjusting being performed in accordance with a short-term dynamic demand adjustment characteristic having a dynamic change level, the dynamic change level being a function of the short-term dynamic demand;

when a constant-speed request exists the adjusting being performed in accordance with a low-dynamic adjustment characteristic having a lower dynamic change level than a dynamic change level of short-term driving dynamic change demands;

when a short-term dynamic demand and a constant-speed request do not exist the adjusting being performed in accordance with a long-term driving manner adjustment characteristic determined by the long-term driving manner behavior component.

4. The method as defined in claim 3 further comprising:

ascertaining the driver behavior in a form of a continuously updated driver behavior index having a value range extending between a first interval end value and a second interval end value, the first interval end value representing a low-dynamic driver behavior having a lower dynamic change level than the dynamic change level of short-term dynamic change demands, the second interval end value representing a highly dynamic driver behavior; and selecting a current accessory adjustment characteristic as a function of the driver behavior index; wherein when a short-tern dynamic demand exists the driver behavior index is set to a short-term dynamic value being the greater of a first value corresponding to the dynamic level demanded and a second value representing the long-term driving manner behavior component;

when a constant-speed request exists the driver behavior index is set to a third value substantially equal to the first interval end value; and when a short-term dynamic demand and a constant-speed request do not exist the driver index is set to the second value.

* * * * *

UNITED STATES PATENT AND TRADEMARK OFFICE
CERTIFICATE OF CORRECTION

PATENT NO. : 6,216,068 B1
DATED : April 10, 2001
INVENTOR(S) : Gimmler et al.

Page 1 of 1

It is certified that error appears in the above-identified patent and that said Letters Patent is hereby corrected as shown below:

<u>Column 8, claim 4,</u>
Line 13, change "short-tern" to -- short-term --.

Signed and Sealed this

Second Day of April, 2002

*Attest:*

*Attesting Officer*

JAMES E. ROGAN
*Director of the United States Patent and Trademark Office*